Patented Aug. 31, 1926.

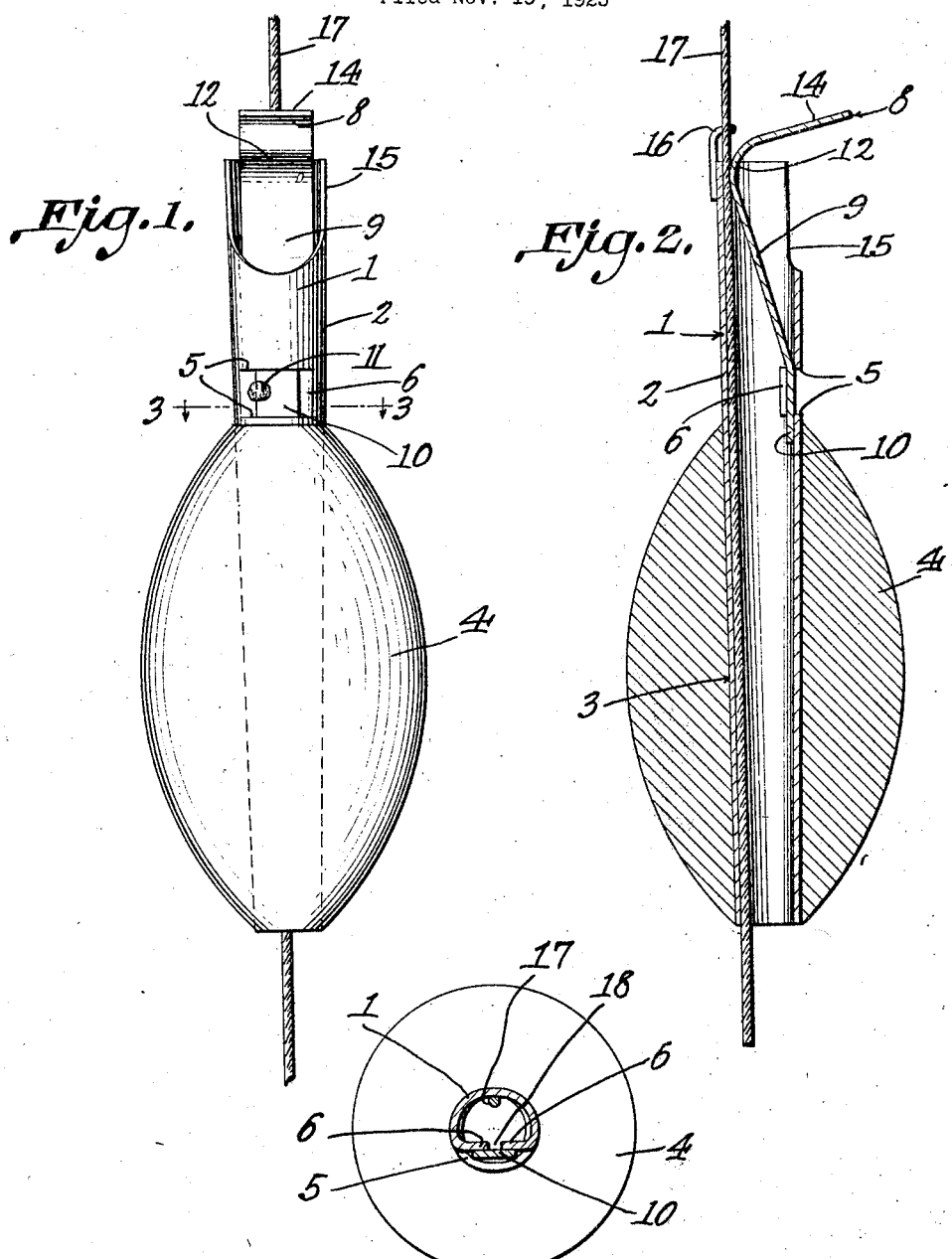

1,598,577

UNITED STATES PATENT OFFICE.

IVER H. HAWKINSON AND ELLIOT McKENZIE, OF MOUNTAIN IRON, MINNESOTA, ASSIGNORS OF FIFTEEN PER CENT TO ERNEST T. HEINSON, OF MOUNTAIN IRON, MINNESOTA.

FISHLINE BOBBER.

Application filed November 19, 1925. Serial No. 70,127.

This invention aims to provide novel means whereby a fishline bobber may be assembled slidably with a fishline, so that when the fisherman reels in the line, the line will slide through the bobber, thereby permitting a shortening of the line, and permitting the fish to be brought up as closely as desired to the end of the fish pole, it being a matter of common knowledge that a fish cannot be reeled in closely, with the ordinary fishline bobber, which is attached more or less securely, and at least, not slidably, with the fishline.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the drawings:—

Figure 1 shows in elevation, a device constructed in accordance with the invention; Figure 2 is a longitudinal section; Figure 3 is a cross section taken about on the line 3—3 of Figure 1.

In carrying out the invention, there is provided a tube 1, made of metal or any other suitable material, the tube, if desired, being tapered from end to end, as shown at 2, so that it may be wedged securely but adjustably in the bore 3 of a float 4 of any desired construction. The tube 1 is provided with transverse slits 5, shown in Figure 1, and with a longitudinal slit 18, indicated in Figure 3. The material freed by the formation of the slits 5 and 18 is extended inwardly to form transverse retainers 6, disposed within the tube 1, in close relation to the side wall of the tube.

The device comprises a grip 8, generally made of resilient metal, and in the form of a strip, the grip 8 comprising a body 9 located in the tube 1, diagonally thereof, the body 9 being supplied at its lower end with a foot 10 inserted between the retainers 6 and the side wall of the tube 1, the foot 10 being joined to the tube 1, at any desired place, by a drop of solder, indicated at 11. The body 9 of the grip 8 merges into a rounded bend 12 which is prolonged to form a handle 14 disposed transversely of the axis of the tube 1, the handle extending laterally beyond the tube, as shown in Figure 2, and extending beyond the upper end of the tube, at an angle to the axis of the tube, as shown in Figure 1. At its upper end, the tube 1 is cut-away at one side, as indicated at 15, so that the foot 10 may be inserted the more readily behind the retainers 6, and to the end, that if desired, the body 9 may be flexed outwardly farther than would be possible if the tube were not cut-away as shown at 15. On the upper end of the tube 1 is located a loop-shaped inwardly extended guide 16 overhanging the upper end of the tube and disposed opposite to the bend 12 of the grip 8.

In practical operation, the fishline, marked by the numeral 17 is extended downwardly through the guide 16, and through the tube 1. The bend 12 of the grip 8 bears against the line 17 and presses the line against the side wall of the tube 1. The bobber, thus, is assembled slidably with the fishline 17, but the construction is such that when the line is reeled in, the line can slide through the tube 1, when the upper end of the tube, or the handle 14 of the grip 8, comes into contact with the fish pole. The result is that the fisherman can handle the fish with as short a line as would be possible were the bobber not used. The guide 16 serves to hold the line 17 in such a place that it will be engaged by the rounded bend 12 of the grip 8. Owing to the fact that the rounded bend 12 is provided, the fishline will not be frayed as it slides through the tube 1 in contact with the inner wall of the tube, and in contact with the part 12. Owing to the fact that the body 9 of the grip 8 can be sprung outwardly through the opening shown at 15, the bore of the tube is cleared to the greatest possible extent, thereby facilitating the insertion of the line 17 through the guide 16.

What is claimed is:—

1. A device of the class described, comprising a float, a tube mounted in the float, the tube being slit transversely to fashion a retainer located within the tube, a resilient grip disposed longitudinally within the tube, the grip being provided at one end with a foot located between the retainer and the inner surface of the tube, the grip being prolonged to form a bend cooperating with the inner surface of the tube at a point opposite to the foot, the bend being extended to fashion a handle prolonged outwardly beyond the tube, the tube being cut-away at one end, at a point opposite to the bend, to facilitate the introduction of the foot behind the retainer, and to permit the body of the grip to be swung outwardly, and a guide carried by the tube and disposed closely adjacent to the bend of the grip.

2. A device of the class described, comprising a float, a tube mounted in the float, a resilient grip disposed longitudinally within the tube, the grip being provided at one end with a foot secured to the inner surface of the tube, the grip including a bend adapted to cooperate with the inner surface of the tube at a point opposite to the foot, the bend being prolonged to fashion a handle located beyond the end of the tube and projecting outwardly beyond the side of the tube, the tube being cut-away at one end, at a point opposite to the bend, to permit the outward swinging movement of the grip, and a guide carried by the tube and located closely adjacent to the bend of the grip.

In testimony that we claim the foregoing as our own, we have hereto affixed our signatures.

IVER H. HAWKINSON.
ELLIOT McKENZIE.